United States Patent Office 2,766,269
Patented Oct. 9, 1956

2,766,269

PRODUCTION OF ESTERS

Max Marin Wirth and Wilfred John Oldham, Sunbury-on-Thames, England, assignors to The British Petroleum Company Limited, a British joint-stock corporation No Drawing. Application October 20, 1951, Serial No. 252,398

Claims priority, application Great Britain October 24, 1950

4 Claims. (Cl. 260—459)

This invention relates to an improved method for the production of esters and ester-intermediates from mineral oil hydrocarbon mixtures.

It is known that by the partial aerial oxidation of mineral oil fractions, mixtures of oxygen-containing compounds are produced. It is known that under controlled conditions the reaction yields hydroperoxides which may, under optimum conditions, constitute about 70% by weight of the total oxygen-containing compounds of the product. In general a mineral oil fraction contains a mixture of naphthenes and normal and branched chain paraffins and, accordingly, a mixture of secondary alkyl-hydroperoxides and tertiary alkyl peroxides are obtained on oxidation.

It has now been found that in reactions involving the hydroperoxide group, particularly of the type described hereinafter, the secondary alkyl hydroperoxides are more reactive and/or provide higher yields of the principal reaction product.

It is an object of the present invention to provide an improved process for the production of esters and ester-intermediates from mineral oil fractions.

According to the present invention alkyl hydroperoxides are produced by a process which comprises contacting a mineral oil or mineral oil fraction with urea, preferably in the presence of methanol, whereby a solid urea-adduct is formed, separating the urea adduct from the residue of the mineral oil, decomposing the urea adduct in known manner to recover a fraction enriched in normal paraffins, which fraction may also contain slightly branched chain paraffins, oxidising the recovered fraction at elevated temperature by means of an oxygen-containing gas, such as air, whereby oxygen-containing compounds, including hydroperoxides, are formed and thereafter reacting an organic hydroperoxide or a salt thereof with a group VB or a group VIB element, as hereinafter defined and of atomic weight above 30, whereby an ester is produced containing the said element in the acid radical thereof.

According to a modification of this process, esters are produced by reacting an organic hydroperoxide or a salt thereof with a compound of a group VB or group VIB element, as hereinafter defined and of atomic weight above 30, said compound being capable of conversion under oxidising conditions to a compound of the element in which compound the element is present in a higher valency state than initially, whereby an ester is produced containing the said element in the acid radical thereof.

Preferred compounds of group VB or group VIB elements for use in the process are sulphur dioxide and phosphorus trichloride. Thus by reaction with sulphur dioxide, alkyl hydrogen sulphates are formed. By reaction with phosphorus trichloride, compounds of the general formula:

R—O—PO—Cl$_2$ are produced, where R is an alkyl group. These phosphorus compounds are readily hydrolyzed to esters. The term "ester intermediate" is used herein with reference to compounds of this and similar type which are convertible to esters on hydrolysis.

The term "group VB or group VIB element" is used herein with reference to an element of group VB or VIB of the periodic table according to Mendeleeff, the elements to which the invention relates being of atomic weight above 30. These elements are phosphorus, arsenic, antimony, bismuth, sulphur, selenium, and tellurium. For use in the process of this invention compounds of arsenic, phosphorus, and sulphur have been found particularly suitable.

Preferably the process of the invention is applied to petroleum fractions, kerosene and gas oil cuts being very suitable. Preferably, sulphur containing constituents of the feedstock are removed before the oxidation stage, the removal being effected before or after the urea adduction stage as desired.

Feedstocks to the urea-adduction step should boil within the range 200° C. to 350° C. When detergents are the desired end products the preferred range is 250–290° C. However, lower or higher boiling feedstocks, for example, comprising hydrocarbons having from 8–30 carbon atoms per molecule, may be processed according to the type of end-product desired.

Conditions for the formation of urea adducts are described by Bengen in German patent application O. Z. 12,438, published in Technical Oil Mission microfilm reel 6, frames 263–70.

The feed-urea ratio employed will depend on the straight chain paraffin content of the feedstock. Preferably, between 5 and 15 moles of urea per mole of straight chain paraffin present is employed.

The methanol required depends mainly on the quantity of urea used. The amount of methanol employed may range from just enough to moisten the solid urea crystals sufficient to form a saturated solution of the urea.

The adduction temperature may vary from about 0° to 40° C., but is preferably 20° to 25° C. In certain cases selective adduction may be achieved by careful control of the adduction temperature.

Decomposition of the adduct may be brought about by treating with a solvent for urea, further methanol or water being suitable, or by heating to about 60°–100° C. A combination of both methods can be used, for example, by heating in the presence of water. Urea hydrolyses with water at an appreciable rate and conditions will normally be modified so as to give for each individual feedstock a rapid adduct decomposition with the least possible urea hydrolysis.

According to a modification of the process of the invention, thiourea is employed instead of urea. Since thiourea forms adduct with naphthenes and branched chain paraffins but not with normal paraffins, the feedstock to the oxidation stage is in this case derived from the residue from the thiourea-adduction stage.

It will be apparent that, from the material remaining of the mineral oil feedstock after separation of the normal paraffins by treatment with urea, tertiary alkyl hydroperxides and naphthene hydroperoxide may be obtained by oxidation with an oxygen-containing gas such as air.

The preferred oxidation temperature for the conversion of the urea adduction product to hydroperoxide lies in the range 110°–180° C. and more particularly in the range 130–150° C.

The hydrocarbon conversion which is most advantageous in practice depends on a balance between obtaining a high efficiency for peroxide formation, this efficiency declining as the per pass conversion of hydrocarbon is increased, and operating with the minimum recycle of hydrocarbon to the oxidation. It is preferred that the per pass conversion of hydrocarbon should be within the limits of 5 percent and 30 percent by weight. Preferably, with any given feedstock the oxidation is carried to a peroxide concentration which is about half the maximum which can be achieved with this feedstock.

The oxidation may be initiated by addition of a compound capable of forming active free radicals under the reaction conditions, for example organic peroxides such as tertiary butyl hydroperoxide or organic hypochlorites. Heavy metal catalysts (e. g. organic salts of cobalt or manganese) may also be used in the oxidation, but the proportion should be small (not more than 0.05% by wt. and preferably not more than 0.01% by wt. on the feed) if satisfactory yields of peroxides are to be obtained. If desired, a small proportion of the oxidation product may be employed to initiate the reaction of subsequent batches of the oxidation feedstock. Alternatively the reaction may be carried out in continuous manner.

If desired, the oxidate may be treated for the concentration of the hydroperoxides before treatment according to the invention. According to one method of concentration, the oxidate is subjected to distillation, usually at reduced pressure, for the removal of at least part of the unreacted hydrocarbon. This method is preferably applied only to relatively volatile feedstocks, for example, having less than 12 carbon atoms/molecule, since with less volatile feedstocks appreciable decomposition of the hydroperoxides may occur, owing to the higher distillation temperatures required.

According to another method of concentration, the oxidate is extracted with a polar solvent, such as for example methanol, ethanol or higher alcohols containing up to four carbon atoms, glycols, or "Cellosolve" and the hydroperoxide concentrate recovered from the extract by distilling off the solvent, preferably at reduced pressure. Alternatively the extract may be diluted with an aqueous medium to throw the hydroperoxide out of solution.

If desired the hydroperoxides may be reacted according to the invention without prior separation of solvent from the extract.

In addition to these physical methods it is possible to concentrate the peroxides chemically. If the crude oxidate is treated with alkali until it is neutral to phenolphthalein, carboxylic acids and only minor amounts of peroxide are extracted into the aqueous layer. Using a large excess of alkali on the oxidate either before or after such removal of carboxylic acids the hydroperoxides may be extracted and recovered as a concentrate by subsequent acidification of the aqueous alkali extract, the efficiency of the process being dependent on the nature of the peroxide present.

Unoxidised hydrocarbons, recovered in the concentration of hydroperoxide, may be recycled to the oxidation stage.

The reaction of the hydroperoxides according to the invention may be carried out using the whole of the oxidation product. If preferred the oxidation product may be treated with aqueous alkali, e. g. caustic soda or alkali carbonates in sufficient quantity and strength to remove the organic acids contained therein before reaction according to the invention. Alternatively, the organic acids may be retained to form a constituent of the final product.

In general the reaction of the hydroperoxides with sulphur dioxides is carried out in the range $-10°$ C. to $60°$ C. although, if desired, lower or higher temperatures may be used. The preferred temperature range is $0°–30°$ C.

According to one method of carrying the invention into practice, sulphur dioxide is passed into an agitated mixture of the hydroperoxide-containing oil and water. When no further amounts of sulphur dioxide react, as indicated by the falling heat evolution, the aqueous phase, containing alkyl and/or naphthene hydrogen sulphates, is separated. The oil phase is washed with water and the total aqueous phase and extracts boiled to remove excess sulphur dioxide and then treated with a metallic base, ammonia, an organic base or other base to form the alkyl sulphate salt or ester. The oil layer, after washing with caustic alkali to remove organic acid if not previously removed, is preferably distilled to separate high boiling residues and may then be recycled to the oxidation stage.

According to an alternative method, the crude oxidation product is treated with sulphur dioxide. When no further amounts of sulphur dioxide are absorbed, excess sulphur dioxide is removed, for example by blowing with an inert gas. Water is then added and the whole product neutralised with a metal base or ammonia. The aqueous layer is separated and the oil layer washed with light petroleum to remove oil and other impurities. The remaining aqueous solution may be evaporated to dryness under conventional conditions. Operating in this manner, carboxylic acid salts are carried through into the product.

The residual oil may be washed with alkali, preferably distilled, to remove high boiling residues and recycled to the oxidation stage.

According to another manner of operation the alkyl and/or naphthenes-hydroperoxides are added slowly to stirred liquid sulphur dioxide maintained at boiling point under reflux. When reaction is complete, sulphur dioxide is evaporated from the separated $SO_2$ layer and the residue aerated to remove any $SO_2$ remaining, taken up with water, neutralised with caustic soda and evaporated to yield the sodium salt of the acid sulphate ester.

According to another manner of operation the hydroperoxides are added with stirring to an aqueous solution of sodium bisulphite formed, for example, by dissolving sodium metabisulphite in water. When the reaction is complete the whole reaction mixture is neutralised with caustic soda. An aqueous layer is separated and evaporated to dryness to yield the sodium salt of the acid sulphate ester.

The following manner of operation is suitable for the production of phosphate esters. Phosphorus trichloride is added slowly to a cooled solution of the hydroperoxide or hydroperoxides in an insert solvent. An exothermic reaction with the evolution of hydrogen chloride takes place. When the reaction is complete excess aqueous caustic soda is added with stirring. An aqueous layer is separated and is acidified with hydrochloric acid. A brown oil, containing the acid ester is separated, extracted with ether, the ethereal solution washed with water, neutralised with aqueous caustic soda and the aqueous solution obtained is evaporated to dryness.

The following manner of operation is suitable for the production of arsenate esters. Arsenic tribromide is added to a solution of the hydroperoxide in an inert solvent at room temperature. The bromide passes into solution and when the slow reaction is complete as shown by a reduced peroxide content, the mixture is extracted with alkali and the neutral aqueous extract evaporated to dryness.

It is obvious that normal paraffinic feedstocks derived by urea-adduction of mineral oil fractions are only one of the possible sources of preponderantly straight chain hydrocarbons which could be used in the process. Products obtained by fractionation of hydrogenated synthesis products from Fischer-Tropsch type processes, or hydrogenated shale oils or of hydrogenated products from the thermal cracking of wax or slack wax are clearly possible feedstocks to the process.

The invention is illustrated but in no way limited by the following example.

EXAMPLE

This example illustrates the separation of a normal paraffin fraction from an aromatic free kerosene cut of low sulphur content by treatment with urea; the oxidation of the paraffin fraction and of the residue fraction after urea treatment; compares the reaction yields of the two oxidised fractions with sulphur dioxide and indicates the relative merits of the products as detergents.

The feedstock employed was a refined kerosene cut from Middle East petroleum which had been heated with sulphuric acid and silica gel for the removal of aromatics and sulphur compounds and which had the following characteristics:

B. P. _____° C__ 210–220
Specific gravity at 60° F _____ 0.7830
Total sulphur _____percent wt__ 0.8014
$n_D^{20}$ _____ 1.4338

The kerosene was treated with urea under the following conditions:

1.5 litres of the kerosene fraction was mixed with 1250 grams of urea and 3 litres of absolute methanol. The mixture was heated to its refluxing temperature (about 70° C.) with stirring and was then allowed to cool slowly to room temperature, stirring being continued. The mixture was then cooled to −10° C. without stirring and the crystals or urea adduct which formed filtered off. The crystals were washed with isopentane and dried free of hydrocarbon by air-blowing. The adduct was then decomposed by mixing with approximately 4 litres of 10% by weight boiling brine solution. The hydrocarbon layer thus produced was separated from the aqueous layer, washed with water, dried with anhydrous sodium sulphate, and filtered. The weight of hydrocarbon so obtained was 230 grams.

The filtrate obtained after removal of the adduct crystals consisted of two phases—a methanol and a hydrocarbon phase. The hydrocarbon layer was separated and freed from methanol by distillation. It was then water washed, dried with sodium sulphate, and filtered. The weight of material so obtained was 650 g. Hydrocarbon lost in the above treatment was dissolved in the methanol used, and in this example was not recovered for reuse.

The normal paraffinic portion so recovered had a refractive index ($n_D^{20}$) of 1.4215, the isoparaffin and naphthene fraction 1.4365, and the original kerosene 1.4338.

The mixture of isoparaffins and naphthenes so obtained was oxidized with air at 140° C., a peak peroxide value of 5.4% peroxide (estimated as having a mol. wt. of 200) was attained in 1.5 hours. This oxidate was then reacted at 0–10° C. with $SO_2$ and excess $SO_2$ removed by air blowing. Water was added and the whole mixture stirred and made neutral to litmus with 10% by weight aqueous caustic soda solution. The aqueous and hydrocarbon phases were then separated, the aqueous phase washed with petroleum ether and the hydrocarbon phase with water. The combined aqueous phase and water washings were evaporated to dryness and the solid residue analysed for active agent content by titration with cetyl pyridinium bromide. The yield of active agent was 30.4% by weight on the peroxide reacted. It was observed that a brownish second phase separated during passage of $SO_2$ through the oxidate. This dissolved on addition of the alkali, but the final solid product was brown in colour.

The normal paraffin fraction was oxidised under the same conditions. A peak peroxide value of 3.4% (estimated as having a mole weight of 200) was reached in 2.5 hours. The oxidate was then reacted with $SO_2$ under the same conditions as in the first test and the yield of active agent was 58.5% by weight based on the initial peroxide. No brown second phase separated during the $SO_2$ reaction and the solid final product was pale buff in colour.

These results for the reaction with sulphur dioxide are shown in the folowing table:

Table

| | Wt. oxidate (grams) | Wt. percent peroxide | Wt. of solid product (grams) | Wt. percent active agent in solid | Percent yield on peroxide by weight |
|---|---|---|---|---|---|
| Isoparaffin-naphthene fraction of kerosene | 192 | 5.4 | 12.5 | 36.2 | 30.4 |
| Normal paraffin fraction of kerosene | 190 | 3.4 | 10.0 | 54.0 | 58.5 |

Comparative washing tests on the two products indicated that the n-paraffinic fraction gave the better detergent.

We claim:

1. A process for the production of esters and ester intermediates which comprises contacting a substantially aromatic-free and sulphur-free mineral oil fraction boiling within the range of about 200° C. to 350° C. with urea whereby a solid urea-adduct is formed, separating the urea-adduct from the liquid phase, decomposing the urea adduct and recovering the normal paraffinic enriched portion from the decomposed adduct, oxidizing the normal paraffinic fraction at elevated temperatures by means of a gas containing molecular oxygen to produce organic hydroperoxides thereof, reacting the formed organic hydroperoxides with a compound selected from the group consisting of sulphur dioxide and phosphorous trichloride whereby an ester is produced.

2. A process in accordance with claim 1 in which the petroleum fraction is a distillation fraction boiling in the range of about 250° C. to 290° C.

3. A process in accordance with claim 1 wherein the mineral oil fraction is kerosene.

4. A process for the production of ester-intermediates which comprises contacting a mineral oil fraction with urea whereby a solid urea-adduct is formed, separating the urea adduct from the liquid phase, decomposing the urea adduct, recovering from the product a fraction enriched in normal paraffins, oxidizing the recovered fraction at elevated temperature by means of a gas containing molecular oxygen whereby oxygen-containing compounds, including hydroperoxides, are formed, and thereafter reacting at least one organic hydroperoxide so formed with phosphorus trichloride whereby an alkoxyphosphoryl dichloride is produced.

References Cited in the file of this patent

UNITED STATES PATENTS

| | | |
|---|---|---|
| 2,020,453 | Beller | Nov. 12, 1935 |
| 2,067,532 | James | Jan. 12, 1937 |
| 2,200,299 | Robinson | May 14, 1940 |
| 2,499,820 | Fetterly | Mar. 7, 1950 |
| 2,569,984 | Fetterly | Oct. 2, 1951 |
| 2,615,921 | Dougherty et al. | Oct. 28, 1952 |
| 2,645,656 | Oldham et al. | July 14, 1953 |